United States Patent
Marilly et al.

(10) Patent No.: US 7,366,160 B2
(45) Date of Patent: Apr. 29, 2008

(54) METHOD OF DETERMINING SERVICE TRENDS

(75) Inventors: Emmanuel Marilly, Antony (FR); Stéphane Betge-Brezetz, Paris (FR); Olivier Martinot, Draveil (FR)

(73) Assignee: Alcatel, Paris (FR)

( * ) Notice: Subject to any disclaimer, the term of this patent is extended or adjusted under 35 U.S.C. 154(b) by 1044 days.

(21) Appl. No.: 10/307,461

(22) Filed: Dec. 2, 2002

(65) Prior Publication Data

US 2003/0108049 A1    Jun. 12, 2003

(30) Foreign Application Priority Data

Dec. 3, 2001    (FR) .................................. 01 15584

(51) Int. Cl.
*H04L 12/66* (2006.01)
(52) U.S. Cl. .................. 370/352; 370/395.21; 709/226
(58) Field of Classification Search ................ 370/352, 370/230, 235, 395.2; 709/219, 232, 224, 709/228; 379/9.03, 112.01
See application file for complete search history.

(56) References Cited

U.S. PATENT DOCUMENTS

| | | | | |
|---|---|---|---|---|
| 5,909,750 A | * | 6/1999 | Sanders | 139/11 |
| 6,246,325 B1 | * | 6/2001 | Chittipeddi | 340/540 |
| 6,272,110 B1 | * | 8/2001 | Tunnicliffe et al. | 370/232 |
| 6,721,750 B1 | * | 4/2004 | Jones et al. | 707/100 |

FOREIGN PATENT DOCUMENTS

WO    WO 0180492 A2    10/2001

OTHER PUBLICATIONS

T. Volochine et al, "Network Management and Traffic Analysis for CICNET", IEEE Network, IEEE Inc., New York, US, vol. 5, No. 5 Sep. 1, 1991, pp. 41-50, XP000248472.

* cited by examiner

*Primary Examiner*—Melur Ramakrishnaiah
(74) *Attorney, Agent, or Firm*—Sughrue Mion, PLLC

(57) ABSTRACT

The invention proposes a method of determining communications network service trends. The invention therefore selects two or more parameters of a network representative of a network service and variable in time, measures at two or more times values of the network parameters, determines at two or more times the value of a service indicator as a function of said measured parameter values, and determines a trend of the indicator as a function of said determined indicator values. The method is used in particular to determine a time remaining before a service violation or the crossing of a threshold.

12 Claims, 4 Drawing Sheets

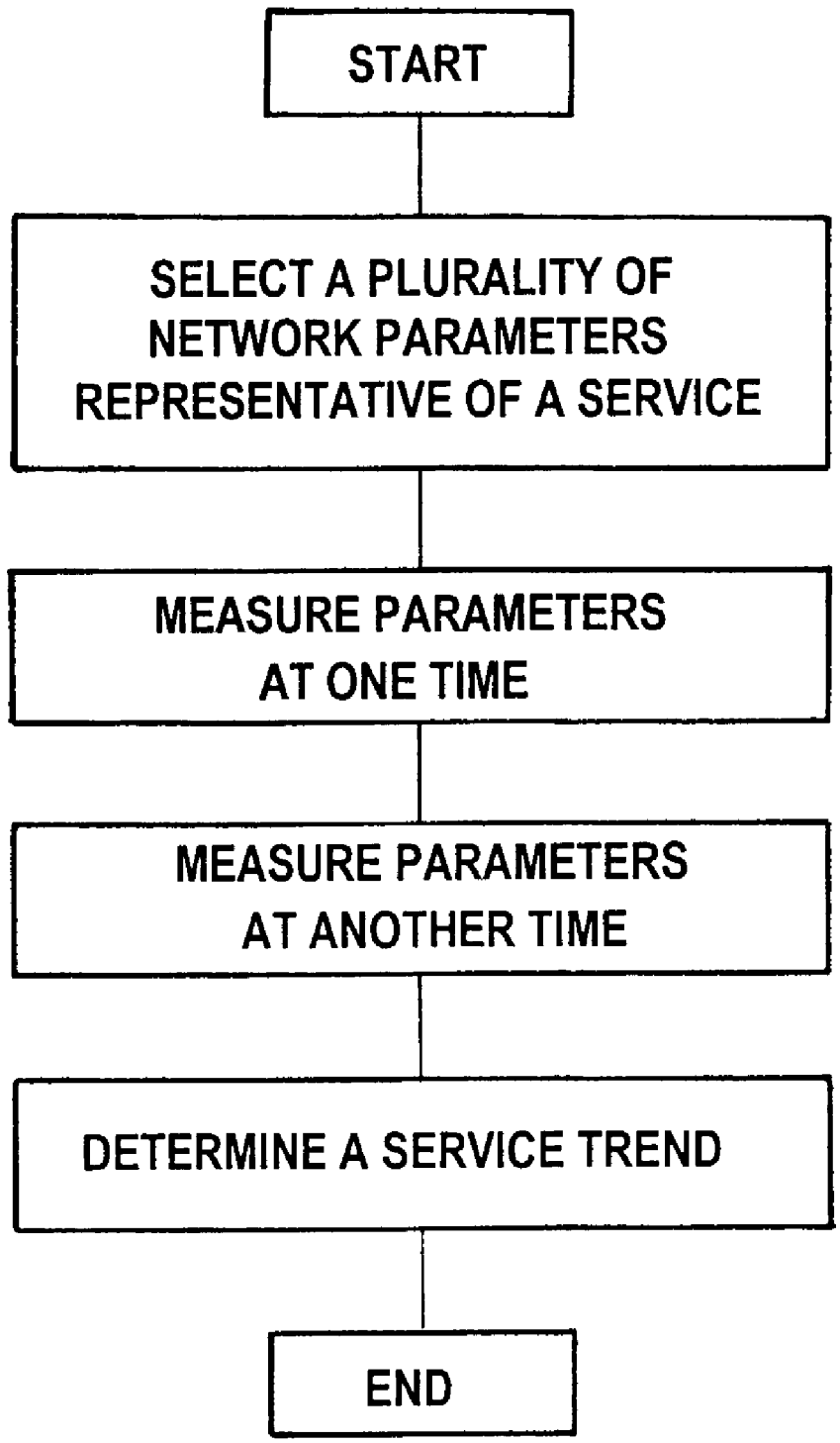
FIG_1

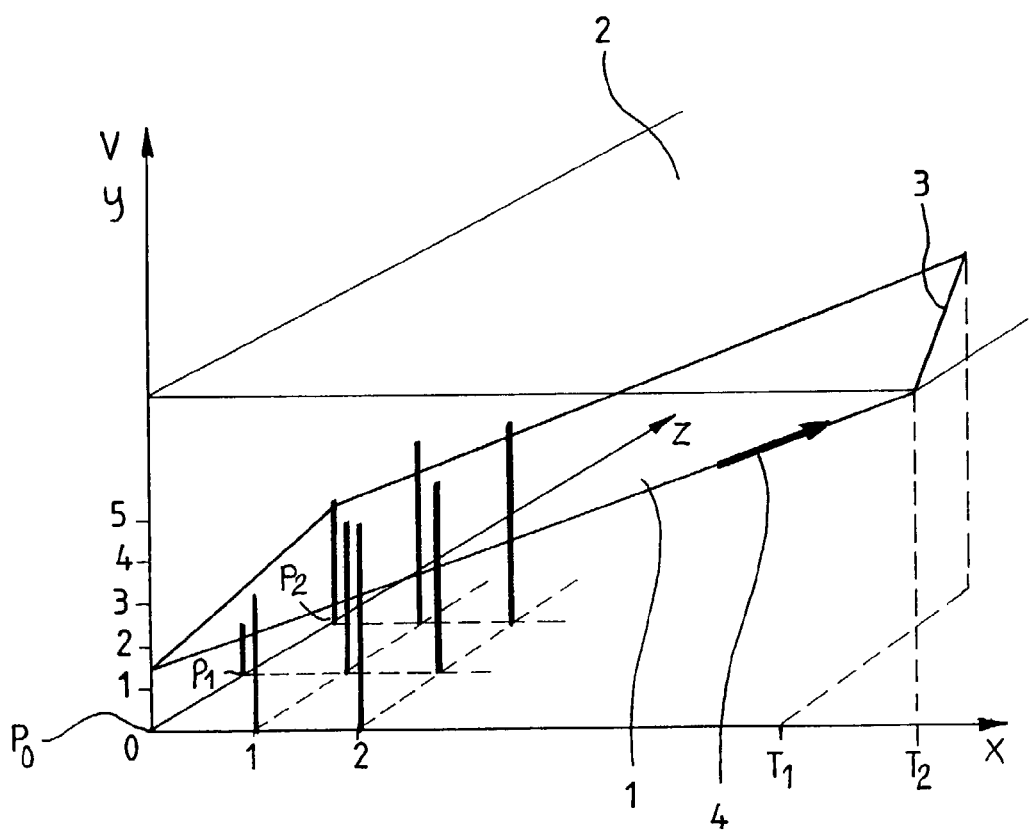
FIG_2

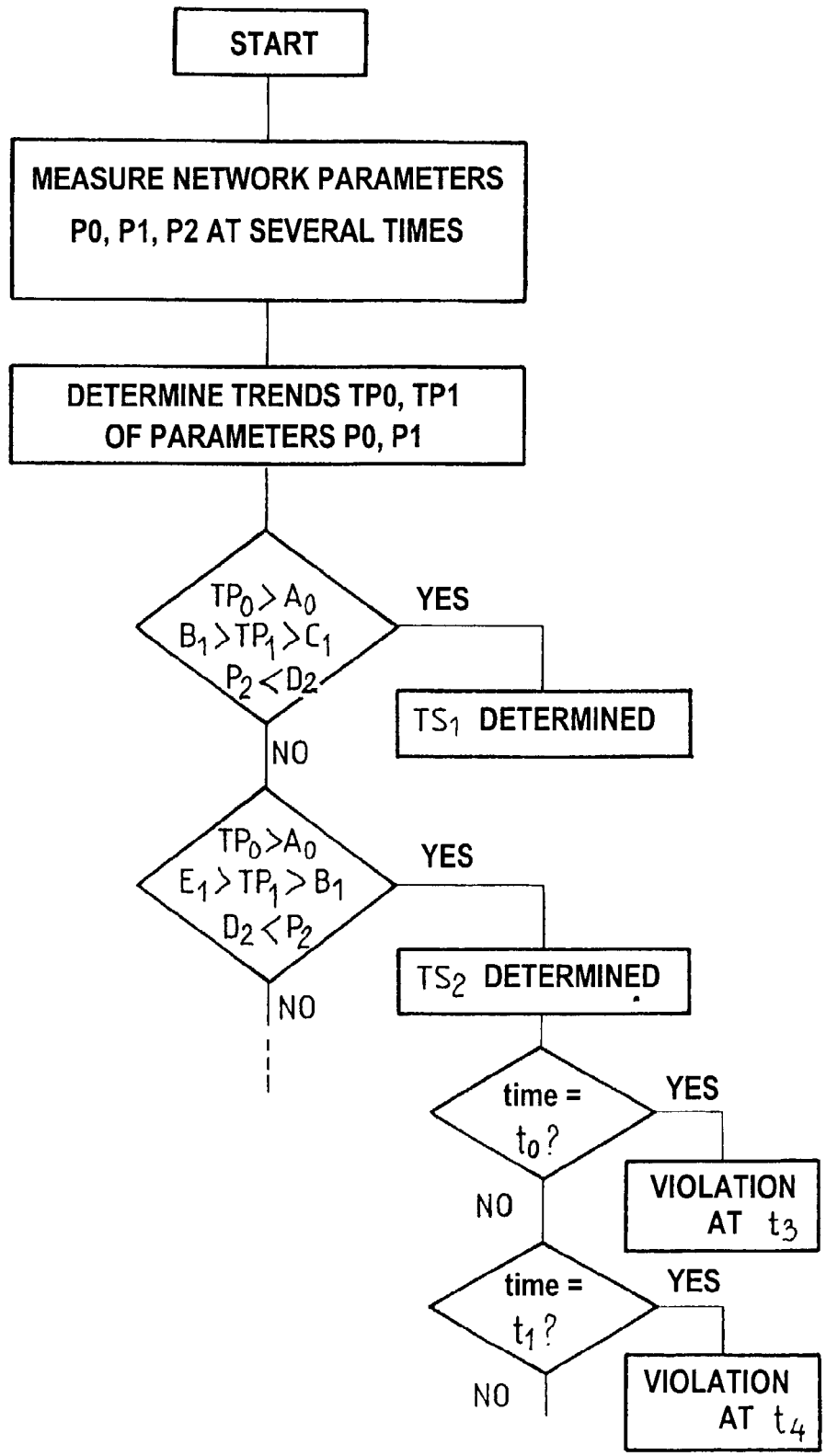
FIG_3

FIG_4
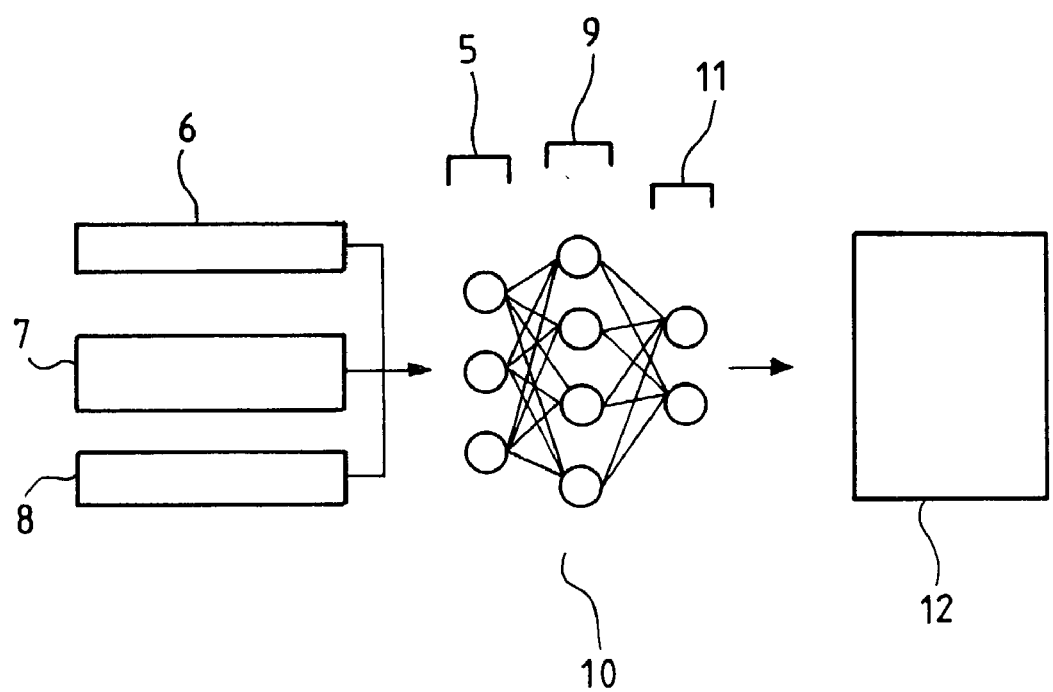

METHOD OF DETERMINING SERVICE TRENDS

The invention relates to network monitoring methods, and more particularly to methods of determining service trends in a telecommunications network.

BACKGROUND OF THE INVENTION

BMC Software's "Patrol Dashboard" product uses a network monitoring method which measures the bandwidth of a network at different times and determines a bandwidth trend as a function of the measurements.

Patent application WO 01/80492 discloses a service quality indicator monitoring technique for use in telecommunications networks. However, monitoring is based on a subjective indicator and not on a trend calculation. Consequently, the variation over time of the monitored indicator cannot be determined.

In service level agreements (SLAs) between a network service provider and a user, the service provider undertakes to provide a network service with a given failure level. The network service may consist in real time transfer of sound or pictures, for example. At present there are no tools for forecasting accurately the failure of a network service.

OBJECTS AND SUMMARY OF THE INVENTION

Thus there is a need for a method that solves this problem.

The invention therefore proposes a method of determining communications network service trends, the method comprising the steps of:
selecting two or more parameters of a network representative of a network service and variable in time;
measuring and/or calculating at two or more times values of the network parameters;
determining at two or more times the value of a service indicator as a function of said measured and/or calculated parameter values; and
determining a trend of the indicator as a function of said determined indicator values.

In one implementation, the method further comprises a subsequent step of determining as a function of the trend of the indicator a time of the service indicator crossing a defined threshold.

In another implementation the network service is selected from the group comprising: voice; videophone; telephone; multimedia; video on demand; private virtual network; real time data; interactive data; and data stream services.

In a further implementation the method further comprises a step of determining an indicator plane by linear regression of the measured and/or calculated network parameters.

In a still further implementation determining the service trend includes comparing parameter values with predetermined thresholds.

Determining the service trend may further comprise:
determining a network parameter trend; and
comparing the parameter trend with a predetermined threshold.

In one implementation the trend of the indicator is determined by a neural network.

In another implementation the method further comprises a training step in which the neural network determines rules of association between a service trend and service parameter values.

In a further implementation the training step comprises inserting into the neural network a training base providing service trend values associated with service parameter values.

In a still further implementation the neural network is a multilayer network.

The method may further comprise a step of calculating a mathematical expectation of financial loss as a function of the network service trend determined.

In one implementation the method further comprises a step of determining a capacity to provide a network service at a given time.

The invention further provides a network and/or service management system using the above method.

Thus the invention indicates a trend of the measured indicator, unlike the above-mentioned patent application WO 01/80492, for example. The trend can show whether the indicator is likely to cross a defined threshold or even determine when it will cross the threshold. In one implementation of the invention, a reliability criterion may also be determined for the estimated threshold crossing time.

BRIEF DESCRIPTION OF THE DRAWINGS

Other features and advantages of the invention become apparent on reading the following description of implementations of the invention, given by way of example and with reference to the drawings, in which:

FIG. 1 shows an algorithm of a simplified example of a method in accordance with the invention for determining network service trends;

FIG. 2 shows a first implementation of a method of determining network service trends;

FIG. 3 shows a simplified algorithm of a second implementation of the invention; and FIG. 4 is a diagram of a neural network used in a third implementation of the invention.

MORE DETAILED DESCRIPTION

The invention proposes a method of determining service trends. To this end various network parameters representative of a service are selected, after which a network service trend is determined as a function of those parameters.

FIG. 1 shows a simplified algorithm of one example of a method of the invention for determining service trends. In a first step of the method, a plurality of network transmission parameters that are representative of a network service is selected. In a second step, the values of the selected parameters at a given time are measured or calculated. In a third step, the values of the parameters at another time are measured or calculated. In a fourth step, a service trend at the later time is determined from the measured parameters. Various types of parameter measured as a function of different network services are described below. Examples of trend determination are also described below.

A level of service indicator can be defined on the basis of measured and/or calculated data. The value of the indicator at different times can be used to determine the service trend. One or more trends extrapolated from measurements of a parameter can also be used in the definition of the indicator. At a given time the indicator can also be defined by the values of different parameters at different times.

In this way a number of network parameters, also known as service level specifications (SLSs), can be identified for preferential observation in order to determine the level of service. These parameters include in particular: packet losses; time-delays between packets; jitter or stability; bandwidth; bandwidth stability; and the directionality of the communication. Parameters that have been calculated or extrapolated from measurements can therefore be used. For example, bandwidth stability changes can be calculated and used in determining the network service indicator. Parameters of this kind enable the reliability of the network service to be determined, for example. Extrapolated parameters can also be used, for example trends of the parameters previously identified.

The service level can relate to any type of network service. The following services may nevertheless be highlighted: voice transfer services; telephone services; videophone services; multimedia transfer services; video on demand services; whiteboard application services; virtual private network services; real time data transfer services; and interactive data transfer services. These service can in particular be used for transmission services conforming to the Internet Protocol (IP).

A plurality of network parameters can be selected to define the level of service as a function of the service or group of services concerned. The parameters can be weighted as a function of their importance for a given level of service. Weighting gives dominant importance to the most sensitive parameters in determining a given network service trend. The table below sets out one example of association and weighting between a network service and network parameters.

The values in the table indicate the weighting or sensitivity of each parameter, from 0 for the minimum weighting to 3 for the maximum weighting.

|  | Packet loss | Time-delay | Jitter | Band-width | Direction-ality |
|---|---|---|---|---|---|
| Voice | 1 | 3 | 3 | 2 | 2 |
| Videophone | 1 | 3 | 2 | 3 | 2 |
| Telephone | 1 | 1 | 0 | 0 | 1 |
| Multimedia | 2 | 3 | 0 | 3 | 1.5 |
| Video on demand | 1 | 3 | 0 | 3 | 1 |
| Whiteboard | 3 | 2 | 0 | 0 | 2 |
| Virtual private network |  |  |  |  | 2 |
| Real time data | 3 | 3 | 0 | 2 | 2 |
| Interactive data | 3 | 2 | 0 | 0 | 1 |
| Data streams | 3 | 1 | 0 | 0 | 1 |

Services can also be grouped into categories of services. The 3GPP and Tequila projects define categories of services and of parameters that are to be accorded preference for the categories concerned. The invention proposes to associate categories of services with network parameters. The table below sets out one example of the weighting of network parameters associated with different categories.

| Service category | Band-width | Packet loss | Time-delay | Jitter |
|---|---|---|---|---|
| Interactive use:<br>Telnet, database access, short Internet transactions, Xwindow, etc. | 1 | 2 | 3 | 1 |
| Interactive multimedia use:<br>Voice or video over IP, etc. | 2 | 2 | 3 | 3 |
| Non-interactive multimedia use:<br>Remote training, broadcasting, etc. | 3 | 2 | 1 | 1 |
| Request-oriented use:<br>Client/Server, etc. | 2 | 1 | 3 | 1 |
| Transfer use:<br>FTP, back-ups, telesales, long Internet transactions, etc. | 3 | 1 | 1 | 1 |

In a first implementation, shown in FIG. 2, a level of service indicator is defined by a geometrical shape, in this example by a plane 1. The measured parameters are represented along three axes defining a three-dimensional space, for example an axis x representing time, an axis y for the parameter values, and an axis z representing the parameters $P_0$, $P_1$ and $P_2$.

An indicator plane 1 can be defined from the values of the parameters in this space. For example, the indicator plane can be obtained by linear regression of the values of the parameters $P_0$, $P_1$ and $P_2$ in a given time interval preceding the time at which the trend is to be determined. For example, the basic principles of spatial-temporal filtering methods that transform the detection of movement in two spatial dimensions into a problem of estimating the orientation of a plane can be used (see Adelson E. H., Bergen J. R., "Spatiotemporal energy models for the perception of motion", J. Optical Society of America, vol. A2, no.2, pp. 284-299, 1985 and Laplante P. A., Stoyenko A. D., "Real time imaging theory, technique and application", IEEE Press 1996. The plane is in itself a service trend indicator.

The parameters represented in the space can be transformed in various ways. Thus a multiplier coefficient can be applied to values of a parameter so that the parameter values have comparable amplitudes. A parameter whose trend is generally the opposite of that of the other parameters can be inverted. A weighting as defined previously can also be used to establish the equation of the indicator plane. For example, weighted regression methods with a priori weights or with weights that are a function of the residues can be used.

Another trend indicator can also be extrapolated from the plane defined above. For example, a trend vector 4 can be defined having coordinates (x, y, o) in the indicator plane. The vector provides a simplified indicator representative of the service trend. Another trend indicator can be extrapolated from the plane 1. For example, this indicator can be the slope of a straight line segment defined by the intersection of the indicator plane and a reference plane with the equation $Z=0$.

These trend indicators are used to define service evolution forecasts, for example. It is therefore possible to establish a time remaining up to a threshold crossing, a level of service after a predetermined time period, a service provision capacity before failure, or a mathematical expectation of loss as a function of the applicable service agreement.

Provision can be made for generating a signal to warn of a predetermined trend being exceeded, for example a visual or an audible signal. A trend having a high slope may be synonymous with imminent failure of the network service, and this kind of signal can enable appropriate preventive measures to be implemented. This form of trend determination also enables the evolution requirements of the network in the short, medium and long term to be determined. Thus the duration of the measurements used to determine the trend as a function of the term to be forecast can be modified.

An example of service level threshold crossing forecasting is given first. In FIG. 2, for example, a service threshold geometrical surface such as a plane 2 can be defined. A curve 3 can then be determined at the intersection between the indicator plane 1 and the threshold geometrical surface or plane 2. For parameters represented with values from 0 to N along the z axis, a time remaining can then be determined from the portion of the intersection curve whose values of z are from 0 to N. The average value of the time of the curve portion or one of its extreme values for z from 0 to N can be used. The lower time value $T_1$ of the curve portion can thus be used to supply the least favorable threshold crossing hypothesis.

Although both a reference geometrical element 2 and an indicator geometrical element 1 are described above as being in the form of planes, any appropriate geometrical shape can be used to extrapolate a trend.

Service trend forecasting can also be used to calculate the mathematical expectation of financial loss. An SLA can specify that the network service provider must pay the user an indemnity. A loss at a given time can then be determined as a function of the terms and conditions of the SLA. Network service priorities can therefore be forecast as a function of loss expectations calculated for different SLA.

Trend determination can also be used to determine the service provision capacity at a given date. If the level of service is forecast at a given level at a given time, a service provision capacity at that time can be determined. A capacity to enter into service level agreements before reaching a saturation service level can therefore be defined.

These forms of service trend determination can also be used in conjunction with other methods of determining trends, a few examples of which are given below.

A second implementation of the method of determining the service level trend, shown in FIG. 3, analyses specific instances of a plurality of network parameters to determine a trend. In this implementation, various network parameters are compared with predetermined threshold logic levels. Boolean criteria can be applied to the parameter values for this purpose. A predetermined service trend is then associated with a combination of parameter levels. This method can include a preliminary step of measuring network parameters and associating the parameters with network service trends. This implementation is particularly appropriate for detecting a trend as a function of practical situations noted by a network operator. In the FIG. 3 example, the trends $TP_0$ and $TP_1$ of the parameters $P_0$ and $P_1$ are determined beforehand. These trends are then used to determine the network service trends $TS_1$ or $TS_2$. Network parameter values are also used to determine the network service trend. The trends determined can be used for the forecasts previously described. Thus there can be a step of forecasting the network service violation time. To determine the service violation time for a particular service trend, account is taken of the time at which the service trend was calculated, for example.

Another implementation is particularly suitable for determining network service trends in which the evolution of the measured or calculated parameters is non-linear. In this implementation, a neural network is used to determine the network service trend. FIG. 4 shows an example of a neural network used in the context of the invention. A multilayer neural network 10 is used, i.e. a network having one or more input layers 5, a hidden intermediate layer 9, and an output layer 11. An input layer 5 having N input neurons, a hidden layer 9 having 2N+1 neurons and an output layer 11 having a number of outputs chosen by the user are used, for example.

Values of network parameters 6 and/or trends 7 of those parameters are applied to the input neurons 5. Threshold values 8 of the parameters SLS can also be applied to the input neurons 5. The values 6, 7 and 8 applied at the input are then processed in the hidden layer 9. The output layer then supplies a number of defined signals 12. The signals 12 can indicate different crossings, for example a warning signal can therefore be provided, such as: a trend threshold crossing warning signal; a time remaining before a service violation threshold crossing warning signal; or any other appropriate warning signal to warn the network operator of how the service is changing.

Use of a neural network can comprise a plurality of steps. In a first time period, a training base is formed, based on experimental results, for example. The training base comprises a multitude of output neuron states as a function of input neuron states. During a training step, the training base is integrated into the neural network. The training step consists of determining the weights of the neural connections of the neural network using training rules. Error gradient backpropagation rules can be used. This method is known in the art and consists in weighting the links between the neurons and recurrently correcting the weightings. Thus the result obtained with a test weighting is compared with a result fixed previously in the training base. The recurrent process is interrupted when the error in respect of the output neurons is below a predetermined threshold. Neural network software is available, for example the Stuttgart Neural Network Simulator. The neural network can also be implemented in the form of an integrated circuit. The person skilled in the art knows how to choose an appropriate number of hidden layers as a function of the complexity of the network service to be monitored.

Using a neural network is more rugged or resistant to error or uncertainty in respect of one or more parameters and also enables non-linear or cyclic behaviors to be observed.

The implementations described by way of example herein are offered by way of illustrative and non-limiting example, and the invention is not limited to the details given here, but can be modified within the scope of the accompanying claims.

What is claimed is:

1. A method of determining communications network service trends, the method comprising the steps of:
   selecting two or more parameters of a network representative of a network service and variable in time;
   measuring and/or calculating at two or more times values of the network parameters;
   determining at two or more times the value of a service indicator as a function of said measured and/or calculated parameter values;
   determining a trend of the indicator as a function of said determined indicator values, and
   determining as a function of the trend of the indicator a time of the service indicator crossing a defined threshold.

2. The method of claim 1, wherein the network service is selected from the group comprising: voice; videophone; telephone; multimedia; video on demand; private virtual network; real time data; interactive data; and data stream services.

3. The method of claim 1, further comprising a step of determining an indicator plane by linear regression of the measured and/or calculated network parameters.

4. The method of claim 1, wherein the determining the service trend includes comparing parameter values to predetermined thresholds.

5. The method of claim 4, wherein the determining the service trend further comprises:

determining a network parameter trend, and comparing the parameter trend to a predetermined threshold.

6. The method of claim 1, wherein the trend of the indicator is determined by a neural network.

7. The method of claim 6, further comprising a training step in which the neural network determines rules of association between a service trend and service parameter values.

8. The method of claim 7, wherein the training step comprises inserting into the neural network a training base providing service trend values associated with service parameter values.

9. The method of claim 8, wherein the neural network is a multilayer network.

10. The method of claim 1, further comprising a step of calculating a mathematical expectation of financial loss as a function of the network service trend determined.

11. The method of claim 1, further comprising a step of determining a capacity to provide a network service at a given time.

12. A network and/or service management system using a method according to claim 1.

* * * * *